(12) United States Patent
Miwa et al.

(10) Patent No.: US 11,920,059 B2
(45) Date of Patent: Mar. 5, 2024

(54) COATING MATERIAL

(71) Applicant: Nippon Telegraph and Telephone Corporation, Tokyo (JP)

(72) Inventors: Takashi Miwa, Tokyo (JP); Masamitsu Watanabe, Tokyo (JP); Azusa Ishii, Tokyo (JP); Soichi Oka, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 574 days.

(21) Appl. No.: 17/257,201

(22) PCT Filed: May 27, 2019

(86) PCT No.: PCT/JP2019/020904
§ 371 (c)(1),
(2) Date: Dec. 30, 2020

(87) PCT Pub. No.: WO2020/008753
PCT Pub. Date: Jan. 9, 2020

(65) Prior Publication Data
US 2021/0155808 A1    May 27, 2021

(30) Foreign Application Priority Data
Jul. 2, 2018   (JP) .................. 2018-125871

(51) Int. Cl.
| C09D 5/08 | (2006.01) |
| C08K 3/08 | (2006.01) |
| C08K 3/30 | (2006.01) |
| C09D 201/00 | (2006.01) |

(52) U.S. Cl.
CPC ............... *C09D 5/084* (2013.01); *C08K 3/08* (2013.01); *C08K 3/30* (2013.01); *C09D 201/00* (2013.01); *C08K 2003/0893* (2013.01); *C08K 2003/3063* (2013.01); *C08K 2003/3072* (2013.01); *C08K 2003/3081* (2013.01)

(58) Field of Classification Search
CPC .... C08K 3/08; C08K 3/30; C08K 2003/0893; C08K 2003/3063; C08K 2003/3072; C08K 2003/3081; C08K 2003/3045; C09D 5/084; C09D 201/00; C09D 5/106; C09D 7/61
See application file for complete search history.

(56) References Cited

U.S. PATENT DOCUMENTS

| 7,166,328 B1 | 1/2007 | Davies et al. |
| 2002/0158230 A1 | 10/2002 | Bortnik |
| 2015/0247052 A1 | 9/2015 | Yamashita et al. |
| 2016/0215630 A1 | 7/2016 | Krishna |

FOREIGN PATENT DOCUMENTS

| CN | 1167128 A | 12/1997 |
| CN | 1344296 A | 4/2002 |
| CN | 101735674 A | 6/2010 |
| CN | 103073969 A | 5/2013 |
| CN | 103540245 A | 1/2014 |
| CN | 104530910 A | 4/2015 |
| CN | 104540910 A | * 4/2015 |
| CN | 105131665 A | * 12/2015 |
| CN | 105131665 A | 12/2015 |
| CN | 105400305 A | 3/2016 |
| CN | 105860615 A | 8/2016 |
| CN | 106883644 A | 6/2017 |
| CN | 107189613 A | 9/2017 |
| CN | 107459929 A | 12/2017 |
| CN | 107760087 A | 3/2018 |
| CN | 107760088 A | 3/2018 |
| DE | 2637773 A1 | 3/1977 |
| JP | S49134740 A | 12/1974 |
| JP | S5228530 A | 3/1977 |
| JP | 2002037954 A | 2/2002 |
| JP | 2007099832 A | * 4/2007 |
| JP | 2007166126 A | 6/2007 |
| JP | 2012183819 A | 9/2012 |
| JP | 2015017256 A | 1/2015 |
| JP | 2016040350 A | 3/2016 |
| JP | 2017101147 A | 6/2017 |
| JP | 2017101147 A | * 6/2017 |
| WO | 2008029833 A1 | 3/2008 |
| WO | 2014020665 A1 | 2/2014 |
| WO | 2019126527 A1 | 6/2019 |

\* cited by examiner

*Primary Examiner* — Anthony J Green
(74) *Attorney, Agent, or Firm* — Slater Matsil, LLP

(57) ABSTRACT

A coating material is allowed to contain a sulfate having a higher degree of solubility in water than that of calcium sulfate. The sulfate is an additive for coating materials which is used for reducing the consumption of zinc (including zinc oxide) in a coating film formed from the coating material and the corrosion of a base material when the coating film is scratched. The content of the sulfate can be 0.004 to 0.65 mol per 100 g of the content of zinc. Alternatively, the content of the sulfate may be 0.006 to 0.186 mol per 100 g of a heating residue (except for the sulfate added) of a coating film.

15 Claims, No Drawings

COATING MATERIAL

CROSS-REFERENCE TO RELATED APPLICATIONS

This application is a national phase entry of PCT Application No. PCT/JP2019/020904, filed on May 27, 2019, which claims priority to Japanese Application No. 2018-125871, filed on Jul. 2, 2018, which applications are hereby incorporated herein by reference.

TECHNICAL FIELD

The present invention relates to a coating material that is used for protecting the metal surface of steel products, etc.

BACKGROUND

One of the corrosion preventive coating materials which protect metal materials (mainly, steels) from corrosion is zinc rich coating materials (zinc rich paints). The zinc rich paints are coating materials containing a high concentration (70 wt % or more after drying of a coating film) of a powder of zinc, and are widely utilized. Owing to the zinc powder contained at a high concentration, the zinc rich paints exert a sacrificial protective action on a more noble metal than zinc even when a coating film is scratched to expose a metal of a base material. Furthermore, zinc ions eluted from the zinc powder in the zinc rich paints form a corrosion product of zinc at the exposed portion so that the corrosion product serves as a protective covering. Thus, the zinc rich paints can form a coating film that obtains an excellent corrosion preventive action based on a sacrificial protective action or a protective covering action brought about by zinc.

CITATION LIST

Non-Patent Literature

Non-Patent Literature 1: Japan Mining Industry Association, Lead Zinc Development Center, "Zinc Handbook, revised edition", p. 360, 1993
Non-Patent Literature 2: Japan Paint Manufacturers Association, Technical Committee, Heavy-Duty Anticorrosion Paint Group, "Heavy-Duty Anticorrosion Paint Guidebook, the fourth edition", p. 28, 2013
Non-Patent Literature 3: Takashi Miwa, Yukitoshi Takeshita, Azusa Ishi, "Technical report—of corrosion behaviors by various accelerated corrosion tests or field exposure tests using coated steel plates", Rust Prevention & Control Japan, 61, 12, p. 449-455, 2017
Non-Patent Literature 4: N. S. Azmat et al., "Corrosion of Zn under acidified marine droplets", Corrosion Science, vol. 53, pp. 1604-1615, 2011
Non-Patent Literature 5: Research group of galvanized steel structures, "Corrosion resistance of hot-dip galvanization, 6. Corrosion resistance in water", [searched on Jun. 27, 2018], (https://jlzda.gr.jp/mekki/pdf/youyuu.pdf)
Non-Patent Literature 6: Takashi Miwa, Azusa Ishi, Hiroshi Koizumi, "Study on accelerated corrosion test solutions more accurately reproducing atmospheric corrosion of zinc in salt-laden environments", Proceedings of JSCE materials and environments, B-308, p. 193-196, 2018.

SUMMARY

Technical Problem

As mentioned above, although zinc rich paints have excellent performance such as a sacrificial protective action and a protective covering action, neither the sacrificial protective action nor the protective covering action works after corrosion and consumption of zinc in a formed coating film.

Zinc rich paints further coated with a coating material (e.g., undercoat or middle coat materials of epoxy resin coating materials, and polyurethane resin or fluorine resin topcoats) present no problem. However, the studies of the inventors have revealed that when a zinc rich paint is used alone and a coating film of the zinc rich paint is exposed to the atmosphere, the corrosion of the zinc powder in the coating film proceeds, and this portion serves as a path for corrosion factors such as water, oxygen, and salts to reduce barrier properties against the corrosion factors while reducing corrosion preventive properties.

It has conventionally been considered that when a zinc powder in a coating film corrodes, voids in the coating film are filled with a corrosion product of zinc to enhance barrier properties against corrosion factors such as water, oxygen, and salts (see Non-Patent Literatures 1 and 2). However, this conventional finding seems to be an event limited to inorganic zinc rich paints with voids in initial coating films. For organic zinc rich paints, initial coating films have no void. The studies of the inventors have confirmed that when zinc in the coating films is converted to a corrosion product by corrosion, this portion serves as a path for corrosion factors such as water, oxygen, and salts to reduce barrier properties against the corrosion factors. When a coating film of a zinc rich paint is exposed to the atmosphere, the corrosion of zinc in the coating film proceeds from the coating film surface toward the inside of the coating film so that the film thickness of a sound portion where zinc does not corrode is decreased.

Possible measures against the consumption of zinc in coating films by corrosion are reduction in the corrosion rate of zinc. Provided that the corrosion rate of zinc can be reduced, a sacrificial protective action and a protective covering action brought about by zinc last for a long period at a scratched portion in a coating film.

Furthermore, provided that the corrosion rate of zinc can be reduced, the corrosion of zinc from coating film surface exposed to the atmosphere toward the inside of the coating film proceeds slowly. Therefore, the rate at which the film thickness of a sound portion in the coating film is decreased by the corrosion of zinc in the coating film can also be reduced at an unscratched portion in the coating film.

In order to reduce the corrosion rate of zinc, for example, zinc rich paints supplemented with aluminum, aluminum-magnesium alloy, or the like are commercially available. Also, there is zinc-based alloy plating having a lower corrosion rate than that of galvanization. Likewise, powders for use in zinc rich paints may be changed to powders of zinc-based alloy having a lower corrosion rate than that of zinc. However, these techniques lead to elevation in cost and present problems such as difficult processing (production) into particle shapes or particle sizes suitable for zinc rich paints.

The present invention has been made to solve these problems. An object of the present invention is to reduce the corrosion rate of zinc in a coating film through an easily producible coating material without elevating cost.

Means for Solving the Problem

The coating material according to the present invention contains a zinc powder, a binder, and a sulfate having a higher degree of solubility in water than that of calcium sulfate.

The coating material according to the present invention contains a zinc powder, a binder, and a sulfate having a higher degree of solubility in water than ⅛ of that of calcium sulfate.

In one configuration example of the coating material, the zinc powder is a powder of zinc alloy comprising zinc and at least one of aluminum and magnesium.

In one configuration example of the coating material, the content of the sulfate is 0.004 to 0.065 mol per 100 g of the content of zinc.

The coating material according to the present invention contains a binder and a sulfate having a higher degree of solubility in water than ⅛ of that of calcium sulfate.

In one configuration example of the coating material, the content of the sulfate is 0.006 to 0.186 mol per 100 g of a heating residue (except for the sulfate added) of a coating film.

In one configuration example of the coating material, the sulfate is at least one of potassium sulfate, sodium sulfate, magnesium sulfate, calcium sulfate, ferric sulfate, ferrous sulfate, lithium sulfate, calcium sulfate, and aluminum sulfate.

In one configuration example of the coating material, the binder is water-soluble.

In one configuration example of the coating material, the binder is dispersible in water.

Effects of Embodiments of the Invention

As described above, embodiments of the present invention produce an excellent effect of reducing the corrosion rate of zinc in a coating film through an easily producible coating material without elevating cost, because a sulfate is added.

BRIEF DESCRIPTION OF THE DRAWINGS

NA

DETAILED DESCRIPTION OF ILLUSTRATIVE EMBODIMENTS

Hereinafter, the coating material according to an embodiment of the present invention will be described.

Embodiment 1

First, the coating material according to embodiment 1 of the present invention will be described. The coating material according to embodiment 1 is basically configured to contain a zinc powder and a binder, as well known as a zinc rich coating material. The binder is generally constituted by a synthetic resin. In embodiments of the present invention, the coating material is allowed to contain a sulfate having a higher degree of solubility in water than that of calcium sulfate. Alternatively, the sulfate may have a higher degree of solubility in water than ⅛ of that of calcium sulfate. The sulfate is an additive for coating materials which is used for reducing the consumption of zinc (including zinc oxide) in a coating film formed from the coating material and the corrosion of a base material when the coating film is scratched. The sulfate contained in the coating material is an elutable sulfate. However, the coating material according to embodiment 1 contains neither benzoic acid nor a salt of benzoic acid, etc.

In this context, the content of the sulfate mentioned above can be 0.004 to 0.65 mol per 100 g of the content of zinc. Alternatively, the content of the sulfate may be 0.006 to 0.186 mol per 100 g of a heating residue (except for the sulfate added) of a coating film. The sulfate contained in the coating material according to embodiment 1 is at least one of potassium sulfate, sodium sulfate, magnesium sulfate, calcium sulfate, ferric sulfate, ferrous sulfate, lithium sulfate, calcium sulfate, and aluminum sulfate. The sulfate may be used in the form of a hydrate or may be used in an anhydrous form. The binder is, for example, a water-soluble material that is also used for aqueous coating materials. Alternatively, a binder dispersible in water may be used.

Hereinafter, this embodiment will be described in more detail with reference to experimental results.

Experiment 1

First, experiment 1 will be described.
Sample Preparation

Magnesium sulfate heptahydrate (hereinafter, referred to as magnesium sulfate) was added to a commercially available zinc rich paint (ROVAL Corp., "AQUA ROVAL") to prepare a sample of experiment 1. AQUA ROVAL is a coating material having a composition of a zinc powder and a water-soluble binder.

First, the magnesium sulfate powder was mixed at weight ratios of 0 (additive-free), 1, 2, 4, 8, and 16 to 100 of the zinc powder (zinc+zinc oxide+amorphous silica) of AQUA ROVAL to prepare 6 types of sample powders.

Each prepared sample powder and an AQUA ROVAL coating material liquid were mixed at a weight ratio of 4:1 to prepare 6 types of sample coating materials. Since the film formation of (coating with) the sample coating materials having a magnesium sulfate weight ratio of 4, 8, or 16 to 100 of the zinc powder was difficult, the solvent (water) was used in an amount larger than the defined amount. The amorphous silica occupies a proportion of 0.5% or smaller in the zinc powder and is thus substantially ignorable.

Two types of steel plates to be coated with the sample coating materials were used: "blasted SS400 steel plate" which underwent surface preparation by blast treatment and "post-corrosion power tool-cleaned steel plate" which underwent corrosion with an aqueous sodium chloride solution followed by surface preparation by power tool cleaning (ISO 8501 St3). Both the plate materials had a planar view of 150×70 (mm) and a thickness of 3.2 mm.

The weight of each sample coating material was measured such that the amount of coating was 250 g/m². Each steel plate was coated therewith by brush painting. After drying, the weight was measured again into 250 g/m², and the steel plate was coated (topcoated) with the sample coating material by brush painting to prepare coated samples 1 to 6. The total amount of coating was 500 g/m².

Coated sample 1 is a sample based on the coating material having the magnesium sulfate powder at a ratio of 0 (additive-free) to 100 of the zinc powder (zinc+zinc oxide+amorphous silica) of AQUA ROVAL.

Coated sample 2 is a sample based on the coating material having the magnesium sulfate powder mixed at a weight ratio of 1 to 100 of the zinc powder (zinc+zinc oxide+amorphous silica) of AQUA ROVAL.

Coated sample 3 is a sample based on the coating material having the magnesium sulfate powder mixed at a weight ratio of 2 to 100 of the zinc powder (zinc+zinc oxide+amorphous silica) of AQUA ROVAL.

Coated sample 4 is a sample based on the coating material having the magnesium sulfate powder mixed at a weight ratio of 4 to 100 of the zinc powder (zinc+zinc oxide+ amorphous silica) of AQUA ROVAL.

Coated sample 5 is a sample based on the coating material having the magnesium sulfate powder mixed at a weight ratio of 8 to 100 of the zinc powder (zinc+zinc oxide+ amorphous silica) of AQUA ROVAL.

Coated sample 6 is a sample based on the coating material having the magnesium sulfate powder mixed at a weight ratio of 16 to 100 of the zinc powder (zinc+zinc oxide+ amorphous silica) of AQUA ROVAL.

After drying of the coating materials, in order to evaluate a sacrificial protective action and a protective covering action on a scratched portion in the coating films, an artificial scratch reaching the steel product was made in an "x" mark pattern in the lower half region of each of the coated samples 1 to 6 using a cutter knife having a small blade to prepare a "coating film damaged portion".

Each of the coated samples 1 to 6 with the coating film damaged portion formed thereon was subjected to a combined cycle test, which repeats salt water spraying, wetting, and drying. The test conditions of the combined cycle test involved carrying out the NTT combined cycle test described in Non-Patent Literature 3 for 960 hours except that not the solution described in Non-Patent Literature 3 but artificial sea water diluted 6-fold with pure water was used as a test solution for accurate performance evaluation of zinc rich paints, because gordaite having high protective properties is generated from sulfate ions contained in sea water by the corrosion of zinc with sea water, as described in Non-Patent Literature 4; however, the aqueous sodium chloride solution used in the technique of Non-Patent Literature 3 contains no sulfate ion and does not generate gordaite.

Experimental Results 1

Experimental results 1 of experiment 1 are shown in Table 1 below. The size of a bulge occurring in a coating film was observed and classified according to "JIS K 5600-8-2". The occurrence of a bulge was markedly suppressed in all the coated samples 2 to 6 supplemented with magnesium sulfate, as compared with the coated sample 1 non-supplemented with magnesium sulfate.

The rust of the coating film damaged portion was classified into "outflow rust >red rust >red spot rust >white rust" in the descending order of the degree of the progression of corrosion. The coated sample 6 having a zinc powder:magnesium sulfate weight ratio of 100:16 was classified into the same category as that of the additive-free sample in terms of the rust classification, but was confirmed to corrode more heavily than the additive-free coated sample 1 did. On the other hand, the coated samples 2 to 5 having a zinc powder:magnesium sulfate weight ratio of 100:1 to 8 also suppressed the rust of the coating film damaged portion. As determined in terms of both a bulge and rust, the coated samples 2 to 5 having a magnesium sulfate weight ratio of 2, 4, or 8 to 100 of the zinc powder had well-balanced performance.

Experiment 2

Next, experiment 2 will be described.

Sample Preparation

Magnesium sulfate used in experiment 1 was changed to sodium sulfate in experiment 2, which was in turn added to AQUA ROVAL to prepare a sample of experiment 2.

A powder of sodium sulfate decahydrate was mixed at a weight ratio of 5.23 to 100 of the zinc powder (zinc+zinc oxide+amorphous silica) of AQUA ROVAL to prepare a powder. This powder and an AQUA ROVAL coating material liquid were mixed at a weight ratio of 4:1 to prepare a sample coating material. This sample was adjusted such that the molar number of sulfate ions was the same as that of the powder having a magnesium sulfate (heptahydrate) powder weight ratio of 4 to 100 of the zinc powder (zinc+zinc oxide+amorphous silica) in experiment 1.

In the same way as in experiment 1, each steel plate was coated with the sample coating material to prepare coated sample 7, and a coating film damaged portion was formed in the prepared coated sample 7, which was then subjected to the combined cycle test.

Experimental Results 2

Hereinafter, experimental results 2 of experiment 2 will be described. The coated sample 7 of experiment 2 having

TABLE 1

Test results of NTT combined cycle test using artificial sea water

|  |  | Coated sample 1 | Coated sample 2 | Coated sample 3 | Coated sample 4 | Coated sample 5 | Coated sample 6 |
|---|---|---|---|---|---|---|---|
|  | Amount of magnesium sulfate powder added based on zinc powder (zinc + zinc oxide + amorphous silica) (weight ratio) | None | 100:1 | 100:2 | 100:4 | 100:8 | 100:16 |
| Blasted steel plate | Size and density of bulge | Size: 4 Density: 5 | Size: 2 Density: 4 | Size: 2 Density: 2 | Size: 2 Density: 2 | Size: 2 Density: 2 | No bulge |
|  | Rust of coating film damaged portion | Red rust | Red spot rust | White rust | White rust | Red spot rust | Red rust |
| Post-corrosion power tool-cleaned steel plate | Size and density of bulge | Size: 5 Or larger Density: 5 | Size: 2 Density: 5 | Size: 2 Density: 3 | Size: 2 Density: 3 | Size: 2 Density: 3 | No bulge |
|  | Rust of coating film damaged portion | Outflow rust | Red rust | Red spot rust | Red spot rust | Red rust | Outflow rust |

Degree of progression of rust of coating film damaged portion: outflow rust > red rust > red spot rust > white rust the powder of sodium sulfate decahydrate mixed at a weight ratio of 4.23 to 100 of the zinc powder (zinc+zinc oxide+amorphous silica), as in the coated sample 4 of experiment 1, produced almost the same results as those about the coated sample 4. When the coated sample 4 and the coated sample 7 were comparatively observed, the coated sample 4 exhibited slightly higher corrosion preventive properties while corrosion preventive properties were also markedly improved in the coated sample 7 compared with the additive-free sample.

The results of the two experiments mentioned above demonstrated that: use of any water-soluble sulfate can be expected to have similar effects; and magnesium salt has a slightly higher corrosion preventive effect than that of sodium salt.

The weight ratios of 1 to 16 as the amounts of magnesium sulfate added in the coated samples 2 to 6 of experiment 1 are indicated by mol to be 0.004 mol to 0.065 mol per 100 g of the zinc powder (zinc+zinc oxide+amorphous silica). Thus, in the case of adding other sulfates, this range is also desirable. As mentioned above, since the coated samples 2 to 5 had well-balanced performance, the range of 0.008 to 0.032 mol per 100 g of the zinc powder is more desirable.

The reason why the addition of magnesium sulfate or sodium sulfate improved corrosion preventive properties is probably that a protective covering of gordaite [$NaZn_4(SO_4)(OH)_6Cl \cdot 6H_2O$] having high corrosion preventive properties is formed by zinc ions eluted from the zinc powder, and sodium ions, chloride ions, and sulfate ions contained in the artificial sea water (≈sea water) (see Non-Patent Literature 4).

In salt-affected lands with incoming sea salt particles, this gordaite is considered to be generated on the surface of zinc. The inventors have studied to improve the corrosion preventive properties of coating materials by intentionally forming a large amount of gordaite. It is known that gordaite as well as zincite [$ZnO$], hydrozincite [$Zn_5(CO_3)_2(OH)_6$], and simonkolleite [$Zn_5(OH)_8Cl_2 \cdot H_2O$] are formed as main corrosion products of zinc.

Among the primary corrosion products of zinc, two products, simonkolleite and gordaite, are corrosion products that are not generated in the absence of chloride ions. Corrosion products of zinc prepared by the corrosion of zinc with artificial sea water were powdered using an agate mortar, and the ratio of gordaite peak intensity (11.0°) to simonkolleite peak intensity (6.5°) (gordaite/simonkolleite ratio) was determined by X-ray diffractometry (XRD analysis). The peak positions used were selected from positions where no other peaks of corrosion products were located at a nearby site.

The corrosion products of zinc were compared between a sample prepared and then subjected directly to the XRD analysis and a sample prepared, then washed with a large amount of pure water for a long time, and then subjected to the XRD analysis. As a result of this comparison, the peak of gordaite appeared from the non-washed sample with a gordaite/simonkolleite ratio of approximately 1. By contrast, the peak of gordaite was very small in the washed sample with a gordaite/simonkolleite ratio decreased to 0.1, which was approximately 1/10 of that of the non-washed sample. These results demonstrated that gordaite is more soluble than simonkolleite is.

From the results describe above, the inventors have made the following discussion about a process in which zinc corrodes by sea salt particles to precipitate gordaite and simonkolleite.

An aqueous solution containing corroded zinc contains zinc ions as well as sodium ions, chloride ions, sulfate ions, magnesium ions, and many other sea water-derived ions, whereas sea water is richer in chloride ions than in sulfate ions. In addition, simonkolleite is less water-soluble (the solubility product is lower) and is easier to precipitate. In this respect, simonkolleite starts to be precipitated first as this aqueous solution is dried to elevate the concentration of the solution. This precipitation of simonkolleite consumes chlorides in the solution so that the ratio of sulfate ions to chloride ions is elevated. Further, gordaite is precipitated after drying and concentration of the aqueous solution.

From these, the inventors have believed that the supply of sulfate ions from an approach other than sea water increases the proportion of gordaite, improves the corrosion preventive properties of zinc, and reduces the corrosion rate of zinc, and can therefore suppress time-dependent reduction in the performance of coating materials, which is a problem of conventional techniques. Thus, the inventors have decided to add a water-soluble sulfate to a coating material.

When a water-soluble salt is added into a coating material, the added salt is typically ionized in water to form ions, which in turn enhance the electroconductivity (reduce electrical resistance) of the water. This seems to work disadvantageously to accelerate the progression of corrosion. Therefore, in the case of adding a water-soluble sulfate to a coating material, it had been unknown, until the experiments conducted by the inventors, which is greater, the advantage of increasing the proportion of gordaite having high protective properties, or the disadvantage of reducing solution resistance in corrosion reaction. Thus, it has neither been thought nor can be easily inferred that the addition of a sulfate to a coating material improves corrosion preventive properties.

It is also known that sulfate ions contained in sea water form gordaite, which is a corrosion product of zinc having high protective properties (Non-Patent Literature 4). Nonetheless, focusing on the solubility products of simonkolleite and gordaite, it cannot be easily inferred that supplying sulfate ions separately from sea water causes intentional precipitation of more gordaite than usual from an earlier stage, where, under a normal condition (by supplying sea water only), only simonkolleite is precipitated whereas gordaite is not formed, so that the corrosion rate of zinc is suppressed, and, thereby time-dependent reduction in the performance of the coating material is reduced.

If the corrosion rate of zinc is reduced too much, firstly, corrosion preventive current for a steel product (iron) exposed to a coating film damaged portion no longer flows so that a sacrificial protective action no longer works. Secondly, the supply of zinc ions to the coating film damaged portion is reduced so that a corrosion product of zinc so as to cover the coating film damaged portion is not formed. Thus, a protective covering action does not function. Therefore, corrosion preventive properties are reduced.

Since a too much reduced corrosion rate of zinc is not preferred as described above, a moderate corrosion rate is necessary. It has been shown for the first time embodiments of by the present invention and cannot be easily inferred that the addition of a water-soluble sulfate reduces the corrosion rate of zinc in a coating material as compared with the corrosion rate in conventional techniques, but maintains the corrosion rate to the extent that the corrosion of a steel product (iron) exposed to a coating film damaged portion can be favorably prevented.

The coating material of embodiments of the present invention supplemented with a sulfate also markedly suppresses a "bulge", which occurs in an undamaged portion in a coating film. This is probably because not only can the corrosion of the zinc powder in the coating film of the coating material be suppressed, but eluted zinc ions form gordaite even on an undamaged portion in the coating film, thereby improving barrier properties against corrosion factors such as water, oxygen, and chloride ions. It cannot be easily inferred that such an effect of suppressing a "bulge" is also obtained.

The sulfate used in embodiments of the present invention can be any water-soluble sulfate as long as the sulfate is dissolved in water to release sulfate ions. The chemical formula of gordaite is $NaZn_4(SO_4)(OH)_6Cl \cdot 6H_2O$. Na and Cl are abundantly contained in sea water. Sea water has weakly alkaline pH and is therefore also relatively rich in OH. Hence, the addition of "zinc sulfate" which can supply the remaining components Zn and $SO_4$ probably precipitates gordaite most efficiently.

The sulfate used is preferably potassium sulfate, sodium sulfate, magnesium sulfate, calcium sulfate, ferric sulfate, ferrous sulfate, lithium sulfate, calcium sulfate, aluminum sulfate, or the like in consideration of influence on the environment and in consideration of relatively inexpensive availability.

The results of experiment 1 and experiment 2 demonstrated that in the case of adding magnesium sulfate or sodium sulfate, magnesium sulfate has a slightly higher corrosion preventive effect. The chemical formula of gordaite is $NaZn_4(SO_4)(OH)_6Cl \cdot 6H_2O$, and magnesium ions are not involved in the precipitation of gordaite. As shown in Non-Patent Literature 5, the reason why magnesium sulfate has a slightly higher corrosion preventive effect is probably that magnesium salts have a higher effect of suppressing the corrosion of zinc. Non-Patent Literature 5 discloses that in addition to the magnesium salts, calcium salts also suppress the corrosion of zinc. Thus, it can be easily inferred that calcium sulfate is also suitably used.

Experiment 3

Next, experiment 3 will be described.
Sample Preparation 3
Calcium sulfate dihydrate (hereinafter, referred to as calcium sulfate) was added to a commercially available zinc rich paint (Kansai Paint Co., Ltd., "SD ZINC 500 MILD") to prepare a sample of experiment 3. SD ZINC 500 MILD is a coating material having a main composition of a zinc powder and a binder (zinc rich coating material). In experiment 3, coating material A, coating material B, coating material C, coating material D, coating material E, coating material F, and coating material G were prepared as samples.

Coating material A is a sample based on the coating material of SD ZINC 500 MILD supplemented with the calcium sulfate powder such that the amount of the calcium sulfate powder added was 0 wt % (additive-free) of the weight of a heating residue (except for the calcium sulfate) of a coating film.

Coating material B is a sample based on the coating material of SD ZINC 500 MILD supplemented with the calcium sulfate powder such that the amount of the calcium sulfate powder added in a dried coating film was 1 wt % of the weight of a heating residue (except for the calcium sulfate) of a coating film.

Coating material C is a sample based on the coating material of SD ZINC 500 MILD supplemented with the calcium sulfate powder such that the amount of the calcium sulfate powder added in a dried coating film was 2 wt % of the weight of a heating residue (except for the calcium sulfate) of a coating film.

Coating material D is a sample based on the coating material of SD ZINC 500 MILD supplemented with the calcium sulfate powder such that the amount of the calcium sulfate powder added in a dried coating film was 4 wt % of the weight of a heating residue (except for the calcium sulfate) of a coating film.

Coating material E is a sample based on the coating material of SD ZINC 500 MILD supplemented with the calcium sulfate powder such that the amount of the calcium sulfate powder added in a dried coating film was 8 wt % of the weight of a heating residue (except for the calcium sulfate) of a coating film.

Coating material F is a sample based on the coating material of SD ZINC 500 MILD supplemented with the calcium sulfate powder such that the amount of the calcium sulfate powder added in a dried coating film was 16 wt % of the weight of a heating residue (except for the calcium sulfate) of a coating film.

Coating material G is a sample based on the coating material of SD ZINC 500 MILD supplemented with the calcium sulfate powder such that the amount of the calcium sulfate powder added in a dried coating film was 32 wt % of the weight of a heating residue (except for the calcium sulfate) of a coating film.

In experiment 3, calcium sulfate has a low degree of solubility in water and was therefore added in a state dispersed as a powder in the zinc rich paint containing a weak solvent as a solvent, instead of being added in a state dissolved in a solvent (water) of the zinc rich paint containing water as a solvent. In experiment 3, the amount of the calcium sulfate powder added was indicated not by a weight ratio to zinc but by a weight ratio to a dried coating film (heating residue) except for the calcium sulfate. Most of commercially available solvent-based zinc rich paints have a combination of a "mixed liquid of a zinc powder, a resin, and a solvent" and a "curing agent". Therefore, the accurate amount of zinc therein is unknown. Hence, the calcium sulfate was added at a weight ratio to a heating residue, which is a parameter described in coating material instructions. Since SD ZINC 500 MILD used in experiment 3 conforms to "JIS K 5553 High build type zinc rich paint, type 2", the amount of metal zinc in the heating residue is at least 70 wt % or more. The zinc contents of organic zinc rich paints are typically on the order of 70 to 90 wt %.

Two types of steel plates to be coated with the coating material A, the coating material B, the coating material C, the coating material D, the coating material E, the coating material F, or the coating material G were used: "blasted SS400 steel plate" which underwent surface preparation by blast treatment and "post-corrosion power tool-cleaned steel plate" which underwent corrosion with an aqueous sodium chloride solution followed by surface preparation by power tool cleaning (ISO 8501 St3). Both the plate materials had a planar view of 150×70 (mm) and a thickness of 3.2 mm.

The weight of each of the coating material A, the coating material B, the coating material C, the coating material D, the coating material E, the coating material F, and the coating material G was measured such that the amount of coating was 320 g/m2. Each steel plate was coated therewith by brush painting. After drying, the weight was measured again into 320 g/m2, and the steel plate was coated (top coated) with the sample coating material by brush painting to prepare coating material A, coating material B, coating material C, coating material D, coating material E, coating material F, and coating material G. The total amount of coating was 640 g/m2 for all the coating materials (samples).

After coating with the zinc rich paints supplemented with calcium sulfate and drying, in order to evaluate a sacrificial protective action and a protective covering action on a scratched portion in the coating films, an artificial scratch reaching the steel product was made in an "x" mark pattern in the lower half region of each of the coating materials A to G using a cutter knife having a small blade to prepare a "coating film damaged portion".

In the same way as in experiment 1, each coating material with the coating film damaged portion formed thereon was subjected to a combined cycle test, which repeats salt water spraying, wetting, and drying. The test conditions of the combined cycle test involved carrying out the NTT combined cycle test described in Non-Patent Literature 3 for 2400 hours. Gordaite having high protective properties is generated from sulfate ions contained in sea water by the corrosion of zinc with sea water, as described in Non-Patent Literature 4. However, the aqueous sodium chloride solution used in the technique of Non-Patent Literature 3 contains no sulfate ion. Hence, in experiment 3, not the solution described in Non-Patent Literature 3 but the "new corrosion test solution (pH 5)" described in Non-Patent Literature 6 was used as a test solution for accurate performance evaluation of each coating material.

Experimental Results 3

Experimental results 3 of experiment 3 are shown in Table 2 below. The occurrence of a red rust in the coating film damaged portion was markedly suppressed in the coated samples based on all the coating materials supplemented with calcium sulfate, as compared with the coated sample based on the coating material A non-supplemented with calcium sulfate. The results about the coating materials C to E supplemented with calcium sulfate at 2 to 8 wt % of the weight of a heating residue of a coating film were particularly favorable. In the coating material G supplemented with calcium sulfate such that the amount of the calcium sulfate added was 32 wt % of the weight of a heating residue (except for the calcium sulfate) of a coating film, the occurrence of red rust in the coating film damaged portion was slightly suppressed whereas red rust, which did not occur in the coating material A, occurred in a portion other than the coating film damaged portion, particularly, an edge portion, in the coating material.

TABLE 2

| | | Coating material A | Coating material B | Coating material C | Coating material D | Coating material E | Coating material F | Coating material G |
|---|---|---|---|---|---|---|---|---|
| | Amount of calcium sulfate powder added based on heating residue of zinc rich paint (weight ratio) | None | 100:1 | 100:2 | 100:4 | 100:8 | 100:16 | 100:32 |
| Blasted steel plate | Rust of coating film damaged portion | Outflow rust | Red rust | White rust | White rust | White rust + red spot rust | Red spot rust | Red rust |
| | Others | | | | | | | Red rust in edge portion |
| Post-corrosion power tool-cleaned steel plate | Rust of coating film damaged portion | Outflow rust | Outflow rust | Outflow rust (milder than that of coating material A) | White rust + red spot rust | White rust + red spot rust | Red spot rust | Red rust, Outflow rust (milder than that of coating material A) |
| | Others | | | | | | | Red rust in edge portion |

Degree of progression of rust of coating film damaged portion: outflow rust > red rust > red spot rust > white rust The coatings prepared as samples (coated samples) had a thinner coating film at an edge portion than at other portions. Therefore, the coating film supplemented with calcium sulfate eventually permits elution of calcium sulfate in small portions from the coating film so that portions having the calcium sulfate become voids. Hence, if the edge portion of a coated sample having a thin coating film has a portion where calcium sulfate is unevenly distributed, red rust presumably occurs easily. As a result of observing the cross section of the coated sample under an electron microscope, uneven distribution of calcium sulfate in the coating film was observed. Thus, even the same amount of calcium sulfate added as that in the coating material constituting the coated sample presumably produces more favorable results by designing the particle size of calcium sulfate, a dispersant, a stirring method, etc.

In experiment 3, the amount of calcium sulfate added was 1 to 32 wt % of the weight of a heating residue of a coating film. This amount corresponds, in terms of a molar amount, to the state where calcium sulfate is added at 0.006 to 0.186 mol per 100 g of the weight of a heating residue (except for the sulfate added) of a coating film. Hence, in the case of adding a sulfate other than calcium sulfate to a solvent-based zinc rich paint, the amount of the sulfate added is 0.006 to 0.186 mol per 100 g of the weight of a heating residue of a coating film.

The coated samples supplemented with calcium sulfate (dihydrate) at 2 to 8 wt % of the weight of a heating residue of a coating film produces particularly favorable results. Thus, the sulfate is particularly desirably added in the range of 0.011 to 0.047 mol per 100 g of the weight of a heating residue of a coating film except for calcium sulfate.

Embodiment 2

Next, the coating material according to embodiment 2 of the present invention will be described. The coating material according to embodiment 2 contains a binder and a sulfate having a higher degree of solubility in water than ⅛ of that of calcium sulfate. The binder is generally constituted by a synthetic resin. The sulfate is an additive for coating materials which is used for reducing the corrosion of a base material when a coating film formed from the coating material is scratched. The sulfate is the same as that in embodiment 1. The sulfate contained in the coating material is elutable. Unlike embodiment 1, the coating material according to embodiment 2 contains no zinc powder. The coating material according to embodiment 2 contains neither benzoic acid nor a salt of benzoic acid, etc.

The sulfate contained in the coating material according to embodiment 2 is at least one of potassium sulfate, sodium sulfate, magnesium sulfate, calcium sulfate, ferric sulfate, ferrous sulfate, lithium sulfate, calcium sulfate, and aluminum sulfate. The sulfate may be used in an anhydrous form or may be used in the form of a hydrate. The binder is, for example, a water-soluble material that is also used for aqueous coating materials. Alternatively, a binder dispersible in water may be used.

The coating material according to embodiment 2 is easily producible as a coating material for coating a base material by, for example, galvanization or zinc spraying, without elevating cost, and can reduce the corrosion rate of zinc for the base material. Owing to the sulfate contained in the coating material, the coating material according to embodiment 2 forms a protective covering of a base material with a corrosion product of zinc. This protective covering can suppress the corrosion of the coated base material.

In embodiment 1, the addition of a sulfate to a zinc rich paint was described. Alternatively, a galvanized or zinc alloy plated steel product may be coated with the coating material containing no zinc powder but containing a sulfate.

Galvanized steel plates exert a sacrificial protective action on a more noble metal (in this case, iron) than zinc when a scratch formed in the formed coating film and the galvanization layer reaches the steel product (iron) beneath the galvanization layer. Furthermore, zinc ions eluted from the galvanization layer form a corrosion product of zinc at the exposed portion to form a protective covering.

Such a corrosion preventive effect of zinc is the same as that of the zinc rich paint. The coating film supplemented with a sulfate on the galvanization layer having such a corrosion preventive effect permits elution of the sulfate from the coating film so that sulfate ions are supplied. The sulfate ions react with zinc ions eluted from the galvanization layer, or chloride ions or sodium ions derived from sea salt to generate gordaite, which is a corrosion product of zinc having high protective properties. As mentioned above, gordaite is also precipitated in the presence of sulfate ions derived from sea salt. In addition, use of the coating material supplemented with a sulfate soluble in water supplies more sulfate ions to a damaged portion in a coating film and a plating layer when the coating film and the plating layer are scratched. Thus, the amount of gordaite precipitated is increased, and a higher protective covering effect is obtained.

Experiment 4

Hereinafter, experiment 4 in embodiment 2 will be described. In the following experiment, samples were used in which an HDZ35 galvanized steel product (plate material having a planar view of 150×70 (mm) and a thickness of 3.2 mm) was coated with an epoxy resin coating material (containing no zinc powder) supplemented with calcium sulfate.

In experiment 4, an HDZ35 galvanized steel product was coated with a coating material prepared by the addition of calcium sulfate dihydrate (hereinafter, referred to as calcium sulfate) to a commercially available weak solvent-modified epoxy resin coating material (Kansai Paint Co., Ltd., "ESCO NB MILD H") to prepare a sample of experiment 4. The coating material density of ESCO NB MILD H was approximately half the value of the coating material density of SD ZINC 500 MILD used in experiment 3. In experiment 3, the experiment was conducted using SD ZINC 500 MILD supplemented with calcium sulfate at 0 to 32 wt % of the weight of a heating residue. In experiment 4, samples were prepared by adding calcium sulfate in an amount of 0 to 16 wt % of the weight of a heating residue, which was half the amount of calcium sulfate added in experiment 3, to ESCO NB MILD H. In experiment 4, coating material H, coating material I, coating material J, coating material K, coating material L, and coating material M were prepared as samples.

Coating material H is a sample based on the coating material of ESCO NB MILD H supplemented with the calcium sulfate powder such that the amount of the calcium sulfate powder added was 0 wt % (additive-free) of the weight of a heating residue of a coating film.

Coating material I is a sample based on the coating material of ESCO NB MILD H supplemented with the calcium sulfate powder such that the amount of the calcium sulfate powder added in a dried coating film was 1 wt % of the weight of a heating residue (except for the calcium sulfate) of a coating film.

Coating material J is a sample based on the coating material of ESCO NB MILD H supplemented with the calcium sulfate powder such that the amount of the calcium sulfate powder added in a dried coating film was 2 wt % of the weight of a heating residue (except for the calcium sulfate) of a coating film.

Coating material K is a sample based on the coating material of ESCO NB MILD H supplemented with the calcium sulfate powder such that the amount of the calcium sulfate powder added in a dried coating film was 4 wt % of the weight of a heating residue (except for the calcium sulfate) of a coating film.

Coating material L is a sample based on the coating material of ESCO NB MILD H supplemented with the calcium sulfate powder such that the amount of the calcium sulfate powder added in a dried coating film was 8 wt % of the weight of a heating residue (except for the calcium sulfate) of a coating film.

Coating material M is a sample based on the coating material of ESCO NB MILD H supplemented with the calcium sulfate powder such that the amount of the calcium sulfate powder added in a dried coating film was 16 wt % of the weight of a heating residue (except for the calcium sulfate) of a coating film.

The weight of each sample coating material was measured such that the amount of coating was 320 g/m². The steel plate was coated therewith by brush painting to prepare coated samples.

After drying of the coating materials, in order to evaluate a sacrificial protective action and a protective covering action on a scratched portion in the coating films, an artificial scratch reaching the steel product beneath the coating film and the galvanization layer was made in an "x" mark pattern in the lower half region of each of the coated samples using a cutter knife having a small blade to prepare a "coating film damaged portion".

Each coated sample with the coating film damaged portion formed thereon was subjected to a combined cycle test, which repeats salt water spraying, wetting, and drying. The test conditions of the combined cycle test involved carrying out the NTT combined cycle test described in Non-Patent Literature 3 for 2400 hours. Gordaite having high protective properties is generated from sulfate ions contained in sea water by the corrosion of zinc with sea water, as described in Non-Patent Literature 4. However, the aqueous sodium chloride solution used in the technique of Non-Patent Literature 3 contains no sulfate ion and does not generate gordaite. Hence, in experiment 4, not the solution described in Non-Patent Literature 3 but the "new corrosion test solution (pH 5)" described in Non-Patent Literature 6 was used as a test solution for accurate performance evaluation of the coated samples based on the coating material H, the coating material I, the coating material J, the coating material K, the coating material L, and the coating material M.

Experimental Results 4

Experimental results 4 of experiment 4 are shown in Table 3 below. The occurrence of a red rust in the coating film damaged portion was markedly suppressed in the coated samples based on all the coating materials supplemented with calcium sulfate, as compared with the coated sample based on the coating material I non-supplemented with calcium sulfate. The results about the coating material I, the coating material J, and the coating material K supplemented with calcium sulfate at 1 to 4 wt % of the weight of a heating residue of a coating film were particularly favorable.

In experiment 4, the coating of a galvanized steel product with a zinc-free modified epoxy resin coating material supplemented with only calcium sulfate is described. It is evident that coating materials obtained using other sulfates or binders other than modified epoxy resin generate a larger-than-usual amount of gordaite and produce similar effects.

In experiment 4, a galvanization layer was coated directly with a modified epoxy resin coating material supplemented with calcium sulfate to prepare an experimental sample, though the coating method is not limited thereto. It is evident that the coating of a layer or a raw material containing zinc, such as a zinc alloy plated steel product, a steel product already coated with a zinc rich paint, or a zinc alloy die cast, instead of the galvanized steel product, with the coating material containing a sulfate produces effects similar to those mentioned above. Alternatively, the steel product may be subjected to zinc spraying or zinc alloy spraying, and the coating material supplemented with a sulfate can be used in this sealing treatment.

In addition, an additional coating film may be formed between a layer containing zinc, such as a galvanization layer or a zinc rich paint, and a layer of the coating material supplemented with a sulfate. For example, the formed coating of an already coated galvanized steel plate may be coated with a modified epoxy resin coating material supplemented with calcium sulfate. The coating in this way generates a larger-than-usual amount of gordaite at a coating film/plating layer damaged portion through sulfate ions eluted from the coating material supplemented with the sulfate, externally supplied sea salt particles, and zinc ions eluted from the galvanization layer, when the coating film and the plating layer are damaged to make a scratch reaching the steel product. This improves corrosion preventive properties at this portion.

For obtaining a sacrificial protective action, galvanization or zinc rich paints are usually required to attain electrical conduction between a steel product (iron) and zinc. Therefore, the steel product is typically coated directly by galvanization or with a zinc rich paint. However, for merely obtaining a protective covering effect, the electrical conduction between zinc and steel is not necessarily required. A larger-than-usual amount of gordaite is generated as long as a larger-than-usual amount of sulfate ions, zinc ions resulting from the corrosion of zinc, and an externally supplied sea salt component are present at a coating film or plating layer damaged portion. This improves corrosion preventive properties at this portion.

For example, when a zinc rich paint-free coating film already formed on a steel product is allowed to remain as a tightly adhering film, which is then coated with a new

TABLE 3

|  | Coating material H | Coating material I | Coating material J | Coating material K | Coating material L | Coating material M |
|---|---|---|---|---|---|---|
| Amount of calcium sulfate powder added based on heating residue of coating material (weight ratio) | None | 100:1 | 100:2 | 100:4 | 100:8 | 100:16 |
| Rust of coating film damaged portion | Red rust | White rust | White rust | White rust | Red spot rust | Red spot rust |

Degree of progression of rust of coating film damaged portion: outflow rust > red rust > red spot rust > white rust coating material, this coating may be achieved with a zinc rich paint containing a sulfate as shown in experiments 1 to 3, or may be achieved with a zinc rich paint and further with a zinc-free coating material containing a sulfate. The formation of the coating film having such a layer configuration produces a protective covering effect, albeit with no sacrificial protective effect, when the coating film is damaged.

In this case, it is not necessarily required that the coating film of the zinc rich paint should be located on the base material side while the coating material containing the sulfate is formed thereon. In another layer configuration, the coating film of the coating material containing the sulfate may be located on the base material side while the coating film of the zinc rich paint is formed thereon. Also, an additional coating film of a different coating material may be inserted between the coating film of the coating material containing the sulfate and the coating film of the zinc rich paint. Alternatively, the base material side may be subjected to zinc spraying or zinc alloy spraying, instead of being provided with the coating film of the zinc rich paint.

Typically, zinc rich paints refer to paints supplemented with 70 wt % or more of a zinc powder. This is because the addition of the zinc powder at a high concentration is required for easily attaining the electrical conduction between a steel product and the zinc powder and between the zinc powders in order to obtain a sacrificial protective action. However, the generation of gordaite at a coating film damaged portion through sulfate ions eluted from the coating material supplemented with the sulfate, externally supplied sea salt particles, and zinc ions eluted from the zinc rich paint suffices for merely obtaining a protective covering effect. Therefore, the content of the zinc powder may not be 70 wt % or more and may be less than 70 wt %.

Experiment 5

Next, effects were studied by experiment 5 using a sulfate having lower water solubility than that of calcium sulfate. A saturated aqueous solution of calcium sulfate has a concentration of 0.0116 mol/L at 20° C. Therefore, when a coating film containing calcium sulfate is contacted with water for a long time, the concentration of sulfate ions and calcium ions becomes 0.0116 mol/L at the maximum. This water is supplemented with sea salt-derived sodium ions, chloride ions, etc., and dried in this state to precipitate gordaite. As a result, corrosion preventive properties are probably improved.

Accordingly, the NTT combined cycle test described in Non-Patent Literature 3 was carried out for 240 hours using aqueous solutions in which calcium sulfate was dissolved in a 7 g/L aqueous sodium chloride solution such that the concentration of sulfate ions and calcium ions was zero and approximately 1/16 (0.000725 mol/L), 1/8 (0.00145 mol/L), 1/4 (0.0029 mol/L), and 1/2 (0.058 mol/L) of the concentration of the saturated aqueous solution of calcium sulfate (0.0116 mol/L). The amount of corrosion in a zinc plate corroded in this way was measured.

Experimental Results 5

Experimental results 5 of experiment 5 are shown in Table 4 below. When the amount of zinc corroded at the calcium sulfate concentration of zero is defined as 100, no large change was seen at the calcium sulfate concentration of 0.000725 mol/L whereas the calcium sulfate concentration of 0.00145 mol/L was found to significantly decrease the amount of corrosion

TABLE 4

| Calcium sulfate concentration in aqueous sodium chloride solution | 0 mol/L | 0.000725 mol/L | 0.00145 mol/L | 0.0029 mol/L | 0.0058 mol/L |
|---|---|---|---|---|---|
| Amount of zinc corroded (normalized against 0 mol/L sample as 100) | 100 | 93 | 69 | 43 | 24 |

As shown in Table 4, the corrosion rate of zinc was significantly reduced at the sulfate ion concentrations of 0.00145 mol/L or higher (approximately 1/8 or higher of the saturated concentration of calcium sulfate). This demonstrated that: the degree of solubility of the sulfate in water can be lower than that of calcium sulfate; and in the presence of a sulfate having a higher degree of solubility in water than 0.00145 mol/L at ordinary temperature, an effect of improving corrosion preventive properties as compared with the absence of the sulfate can be obtained when surface having a coating mainly composed of zinc (coating film surface) is coated with a coating material supplemented with this sulfate.

The results of experiment 5 suggest that a sulfate having lower water solubility (poorly soluble sulfate) than 1/8 of that of calcium sulfate at ordinary temperature cannot sufficiently supply sulfate ions. The degree of solubility of calcium sulfate in water is 0.24 g/100 ml (20° C., anhydrous) and 0.2 g/100 ml (20° C., dihydrate). Thus, any sulfate having water solubility equal to or higher than 1/8 of the degree of solubility of calcium sulfate in water can be suitably used.

In this context, important is the sulfate ion concentration. Therefore, the water solubility equal to or higher than 1/8 of that of calcium sulfate is based not on the weight of the sulfate dissolved in water per unit volume but on the molar amount thereof. Thus, in embodiments of the present invention, the sulfate having 1/8 or higher of the degree of solubility, 0.2 g/100 ml (2 g/L), of calcium sulfate dihydrate (molecular weight: 172.17) in water refers to a sulfate that exhibits water solubility equal to or higher than 1/8 of 2 g/L/172.17=0.0116 mol/L, i.e., 0.00145 mol/L, at ordinary temperature.

Calcium sulfate has water solubility as low as approximately 0.2% at 20° C. and can therefore supply sulfate ions in small portions over a long period as compared with sulfates having high water solubility. The sulfate having water solubility less (poorly soluble sulfate) than 1/8 of that of calcium sulfate cannot sufficiently supply sulfate ions and is therefore unsuitable for the purposes of embodiments of the present invention.

When calcium sulfate having low water solubility is added to an aqueous coating material containing a water-soluble binder with water as a solvent, a moiety undissolved in the solvent (water) is granulated to make coating difficult. On the other hand, calcium sulfate can be added as an extender pigment insoluble in a solvent, as in the zinc powder, to a coating material containing an organic binder with an organic solvent as the solvent. A sulfate other than calcium sulfate may be added as an extender pigment to a coating material containing an organic solvent as a solvent.

In embodiments of the present invention, any water-soluble sulfate can be suitably used. It can be easily inferred that the sulfate to be added is not limited by any one type, and a plurality of sulfates may be added in combination. In embodiments of the present invention, it is important to supply sulfate ions in small portions over a long period. Use of a sulfate having too high water solubility generates sulfate ions in a short period and can no longer supply sulfate ions thereafter.

For example, the corrosion of the samples Supplemented with magnesium sulfate, used in experiment 1, was prevented more favorably as compared with the additive-free sample even after the NTT combined cycle test carried out for 960 hours. When this test was carried out for 480 hours, this effect was more marked as compared with the additive-free sample. This is probably because owing to the high water solubility of magnesium sulfate, magnesium sulfate was eluted in a short time at a damaged portion or near the surface of the coating film during the test and thereby decreased in an amount so that sulfate ions were not sufficiently supplied from the middle of the test, reducing the advantages over the additive-free sample. Since magnesium sulfate heptahydrate has a molecular weight of 246.48 and a degree of solubility of 71 g/100 ml (20° C.) in water, the degree of solubility is indicated by mol/L to be 2.88 mol/L (20° C.). Thus, for obtaining effects over a longer period than that of magnesium sulfate, it is preferred that the degree of solubility of the sulfate in water should be 2 mol/L (20° C.) or lower.

Calcium sulfate used in experiment 3 and experiment 4 exerted more marked effects as compared with the additive-free sample, even when the NTT combined cycle test was carried out for 2400 hours. Since calcium sulfate dihydrate has a degree of solubility of 0.2 g/100 mL (20° C.) in water, the degree of solubility in water is converted to 0.0116 mol/L (20° C.) in terms of mol/L. Thus, for obtaining effects over a longer period than that of magnesium sulfate, it is more desirable that the degree of solubility of the sulfate in water should be 0.1 mol/L (20° C.) or lower.

Use of a sulfate other than calcium sulfate and a calcium salt in combination may also be possible instead of use of calcium sulfate. For example, in the case of using sodium sulfate and calcium hydroxide in combination, sulfate ions and calcium ions are supplied by the corrosion of a sample, as in the case of using calcium sulfate. Thus, similar effects (increase in the amount of gordaite precipitated and improvement in corrosion preventive properties) are obtained. However, from the viewpoint of the degree of solubility in water mentioned above, this combination is not desirable because sodium sulfate and calcium hydroxide have a higher degree of solubility in water than that of calcium sulfate and are therefore easily lost by elution due to rainfall, etc.; thus the effects are lost in a shorter time than that of the case of using calcium sulfate.

In salt-affected lands with incoming sea salt, sodium ions are abundantly supplied. By contrast, in salt-affected lands with a snow melting agent, calcium chloride or magnesium chloride is often used as the snow melting agent. In this case, if only calcium sulfate is added into a coating material or a zinc rich coating material, which contains no sodium, corrosion preventive properties are not improved because sodium ions necessary for the generation of gordaite [$NaZn_4(SO_4)(OH)_6Cl \cdot 6H_2O$] are not supplied. In order to prevent this, a salt that releases sodium ions is added.

However, since sodium sulfate has high water solubility, the addition of only sodium sulfate forms, in a short period, voids at portions supplemented with the sulfate to reduce the barrier properties of a coating film against oxygen, water, and salts. In respond to this, it can be easily inferred that a mixed powder of sodium sulfate and calcium sulfate, or a sulfate, such as glauberite [$Na_2Ca(SO_4)_2$], which can release a plurality of cations, may be used for decreasing the proportion of sodium sulfate. Alternatively, it can also be easily inferred that a mixed powder of a low water-soluble sulfate containing no sodium (e.g., calcium sulfate) and a low water-soluble sodium salt other than sulfate is applicable.

It can also be easily inferred that when a mixture of sodium sulfate contained in a capsule having moderate water solubility and a calcium sulfate powder is used, the sodium sulfate contained in a capsule can supply sodium ions in smaller portions than those of a powder form in such a mixture and produces effects over a longer period.

In embodiments of the present invention, hydrates of the sulfate (magnesium sulfate heptahydrate, sodium sulfate decahydrate, and calcium sulfate dihydrate) were used. It can be easily inferred that the sulfate to be added may be used in an anhydrous form or may be used in the form of n hydrate (wherein the value of n may be different from that of the hydrates described above) as long as the sulfate can be dissolved in water to form sulfate ions.

In embodiments of the present invention, the experiments were conducted using AQUA ROVAL from ROVAL Corp. and SD ZINC 500 MILD from Kansai Paint Co., Ltd. as zinc rich coating materials. It can be easily inferred that similar effects are obtained, irrespective of the type of the binder or the type of a contained component other than the zinc powder, as long as the coating material (coating material) is supplemented with a high concentration of the zinc powder. Also, the experiments were conducted using ESCO NB MILD H from Kansai Paint Co., Ltd. as a zinc powder-free coating material with which a galvanization layer was coated. It can be easily inferred that similar effects are obtained, irrespective of the type of the binder.

For the purpose of improving corrosion resistance, a powder of zinc alloy composed of zinc supplemented with a small amount of aluminum or magnesium may be used as a zinc powder for use in zinc rich paints. It can be easily inferred that any zinc rich paint containing a powder prepared using such alloy composed mainly of zinc releases zinc ions by the corrosion of the zinc alloy, as in usual zinc rich paints, and as such, produces similar effects when used in embodiments of the present invention.

In the experiment of embodiment 2 mentioned above, the case of coating a galvanized steel plate with a coating material containing no zinc powder but containing only calcium sulfate is described. It can be easily inferred that in the case of coating a material having a coating mainly composed of zinc (zinc alloy plating layer, zinc alloy die cast, etc.) other than a galvanization layer, use of embodiments of the present invention produces similar effects.

[In embodiments of the present invention, the sulfate was added in the form of a powder to the coating material. It can also be easily inferred that when the sulfate powder coexists with a sulfate contained in a water-soluble capsule, the sulfate contained in the water-soluble capsule serves as a time-lagged source of supply of sulfate ions and produces effects over a longer period.

As described above, t embodiments of he present invention enable reduction in the corrosion rate of zinc in a coating film through an easily producible coating material without elevating cost, because a sulfate is added.

Even in the case of using a coating material (containing a zinc powder) alone, embodiments of the present invention can not only suppress the corrosion of the zinc powder in a coating film, but can suppress the occurrence of a bulge at an undamaged portion of the coating film because eluted zinc ions form gordaite not only on a base material (steel) exposed to a coating film damaged portion but on the undamaged portion in the coating film, thereby improving barrier properties against corrosion factors such as water, oxygen, and chloride ions.

The coating material of embodiments of the present invention has a slower corrosion rate of zinc and is less likely to advance time-dependent reduction in performance as compared with coating materials conventionally used. Therefore, a coating system in which this coating material is adopted is longer-life and more highly corrosion preventive. As a result, the interval of repainting can be prolonged, and cost required for the repair and maintenance of steel structures can be reduced.

The present invention is not limited by the embodiments described above. It is obvious that various changes or modifications and combinations can be made by those skilled in the art without departing from the technical brief of the present invention.

The invention claimed is:

1. A coating material comprising:
a zinc powder;
a binder; and
a sulfate having a higher degree of solubility in water than an eighth of a degree of solubility in water of calcium sulfate, and wherein a content of the sulfate is 0.004 to 0.065 mol per 100 g of a content of zinc in the coating material.

2. The coating material according to claim 1, wherein the zinc powder is a powder of zinc alloy comprising zinc and at least one of aluminum or magnesium.

3. The coating material according to claim 1, wherein the sulfate is at least one of potassium sulfate, sodium sulfate, magnesium sulfate, calcium sulfate, ferric sulfate, ferrous sulfate, lithium sulfate, or aluminum sulfate.

4. The coating material according to claim 1, wherein the binder is water-soluble.

5. The coating material according to claim 1, wherein the binder is dispersible in water.

6. A coating material comprising:
a zinc powder;
a binder; and
a sulfate having a higher degree of solubility in water than an eighth of a degree of solubility in water of calcium sulfate, wherein a content of the sulfate is 0.006 to 0.186 mol per 100 g of a heating residue of a coating film, wherein the heating residue excludes the sulfate added.

7. The coating material according to claim 6, wherein the zinc powder is a powder of zinc alloy comprising zinc and at least one of aluminum or magnesium.

8. The coating material according to claim 6, wherein the sulfate is at least one of potassium sulfate, sodium sulfate, magnesium sulfate, calcium sulfate, ferric sulfate, ferrous sulfate, lithium sulfate, or aluminum sulfate.

9. The coating material according to claim 6, wherein the binder is water-soluble.

10. The coating material according to claim 6, wherein the binder is dispersible in water.

11. A coating material comprising:
a binder; and
a sulfate having a higher degree of solubility in water than an eighth of a degree of solubility in water of calcium sulfate, wherein a content of the sulfate is 0.006 to 0.186 mol per 100 g of a heating residue of a coating film, and wherein the heating residue excludes the sulfate added.

12. The coating material according to claim 11 further comprising zinc powder.

13. The coating material according to claim 11, wherein the sulfate is at least one of potassium sulfate, sodium sulfate, magnesium sulfate, calcium sulfate, ferric sulfate, ferrous sulfate, lithium sulfate, or aluminum sulfate.

14. The coating material according to claim 11, wherein the binder is water-soluble.

15. The coating material according to claim 11, wherein the binder is dispersible in water.

* * * * *